Patented Apr. 13, 1926.

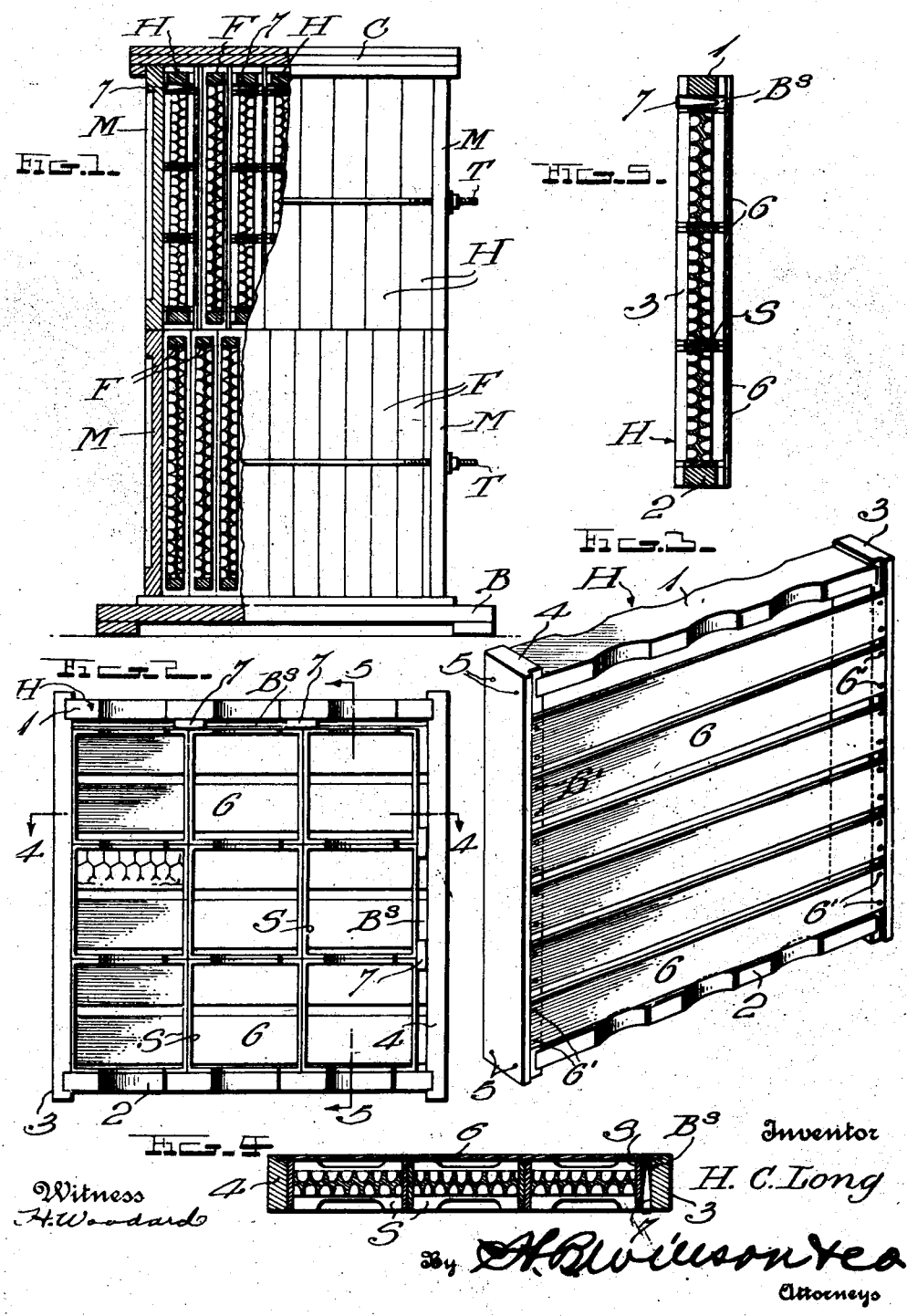

1,580,513

UNITED STATES PATENT OFFICE.

HENRY C. LONG, OF OTTAWA, KANSAS.

BEEHIVE.

Application filed July 9, 1925. Serial No. 42,496.

*To all whom it may concern:*

Be it known that I, HENRY C. LONG, a citizen of the United States, residing at Ottawa, in the county of Franklin and State of Kansas, have invented certain new and useful Improvements in Beehives; and I do declare the following to be a full, clear, and exact description of the invention, such as will enable others skilled in the art to which it appertains to make and use the same.

In the art of bee culture, it is difficult to promptly start the bees to work in a newly applied honey section super and they are prone to swarm instead of working. It is known however that if a portion of the contents of the brood chamber is placed in the super, the bees will not desert the moved portion of the brood, but will immediately start to work storing honey around it in the super. This knowledge has led to attempts toward the production of practical hives in which the honey section holders are about the same size as the brood frames, permitting a partially or totally filled brood frame to be substituted for a honey section holder, and thus effectively inducing the bees to store honey in the super. A further advantage exists for making the honey section holders substantially as large as the brood frames, as said holders can then contain a greater number of honey sections and consequently the bee keeper is relieved of the trouble of adding or charging supers as frequently as now necessary.

In spite of the marked advantages for hives of the type mentioned, they have not come into practical use and the difficulties encountered in the production of comb honey have caused a great many bee keepers to abandon its production and produce only extracted honey, regardless of the fact that it brings an appreciably lower price on the market.

The primary reason the brood-frame-size honey section holder has not come into extended use, is that no practical, easily handled and inexpensive section holder of this type has been devised which will permit quick and easy removal of the filled sections (glued to the holder by the bees) without damage. Section holders have been devised formed of detachably and hingedly connected side and end members and the tiers of honey sections are tightly surrounded and held by such members and when the filled sections are to be removed from the holders, the latter are released and expanded. This permits removal of the sections without damage, but the cost of section holders of this type and the waste of time required in their use, are prohibitive.

After years of exerience as a bee keeper, keeping constantly in mind, the desirability of the brood-frame-size section holder, yet the inadvisability of using such section holders of the types heretofore known, I have finally devised a new and improved form of holder which meets all requirements—is simple and inexpensive, possesses no loosly connected side and end members, facilitates insertion of the empty honey sections, readily holds such sections in place, permits quick and easy removal of filled sections without danger of breakage, may be handled speedily and with ease, and may readily be placed with a totally or partly filled brood frame to induce the bees to promptly start to work in the super without swarming. The manner in which I carry my invention into effect is shown in the accompanying drawing.

Figure 1 is a side elevation partly in section showing my invention embodied in the general type of hive shown by expired U. S. Patent No. 330,478 of Nov. 17, 1885.

Figure 2 is a side elevation of one of the section holders and a plurality of sections held therein.

Figure 3 is a perspective view of one of the holders looking in the opposite direction from Fig. 2.

Figures 4 and 5 are respectively a horizontal and a vertical sectional view as indicated by lines 4—4 and 5—5 of Fig. 2.

The type of hive shown comprises briefly, a base B, a plurality of brood frames F, a plurality of section holders H, front and back boards or other members M, tie-bolts T connecting the members M, and a cap C. The brood chamber is composed of two of the members M, a plurality of the brood frames F between said members and resting on the base B, and a pair of the tie-bolts T clamping the brood frames and the members M together, but when loosened, permitting changing of brood frames, removal of some, reinsertion of others, etc.

The super at one time or another, may consist only of a plurality of the honey section frames H, two of the members M, the cap C and tie-bolts T, but ordinarily, in order to induce the bees to promptly start to work in the super, one of the brood frames F is included in the make-up of said super, as indicated in Fig. 1. In order to permit this, the frames F and H are of substantially the same size.

Each honey section frame or holder H comprises a rectangular wooden frame having top and bottom side members 1 and 2, connected by vertical end members 3 and 4, permanent connections including nails or the like 5, being provided between the side and end members. The frame H is adapted to contain several horizontal rows or tiers of contacting comb honey sections S, and the internal length of this holder is greater by at least a bee space, than the length of any horizontal row or tier of said sections. Similarly, the internal height of the holder H is greater by at least a bee space, than the combined height of all of the horizontal rows or tiers of honey sections. Thus, when these sections are placed within the holder, in contact with each other, they may be forced laterally into contact with one of the end bars 3—4 and may be shifted vertically into contact with one of the side members 1—2. Bee spaces BS are thus left between the group of honey sections and one side and one end member of the holder, as shown most clearly in Figs. 2, 4 and 5. As the bee spaces BS are sufficiently large to permit the bees to readily pass therethrough, they will not attempt to seal these spaces with bee glue or propolis and hence there is ample room left for relatively shifting the sections S when they are filled, so as to loosen them from one another and permit easy removal from the holder H without danger of breakage.

To provide separators between the holders H, I secure slats or the like 6 to one edge of each of said holders, and the separator thus provided is permanently attached to the holder H, nails 6' being preferably used for this purpose. Not only does the separator perform the usual function as a separator, but by having it attached permanently to the holder H, it assists materially in properly placing the honey sections S in said holder, when the latter is either laid flat or supported for instance in an inclined position. To hold the sections S in proper relation until the holder H is in readiness to be placed in the hive, I preferably provide a number of wedges 7 which are adapted to be forced into the bee spaces BS, as shown. These wedges may either be removed when the frames are inserted in the hives, or may be left in place, as desired.

When the sections S have been filled with honey, the frames H may be removed from the hive and if the wedges 7 have not previously been removed, they are now withdrawn. The bee spaces BS now leave ample room for shifting the filled honey sections, to insure easy removal thereof from the holder, without danger of breaking or starting leaks in any of said sections. Moreover, as the separator 6—6 is resilient, it may readily be sprung away from the filled sections, if the bees have secured the separator and sections together by propolis. Not only is it advantageous to have the separator 6—6 permanently attached to the holder H, for the reasons so far given, but it will be observed that by so doing, less loose parts need be handled and moreover, by using two members of the holder or frame H upon which to secure the slats or the like of which the separator is formed, an exceptionally inexpensive construction is produced, considerably less expensive than if other wooden strips were employed, to which to secure the ends of the strips or the like 6.

It will be seen from the foregoing that I have produced distinct improvements in the construction of honey section holders and it should moreover be understood that the improved holders are not restricted to use in connection with any particular type of hive. In all instances, these holders effectively overcome difficulties heretofore encountered with section holders large enough to be replaced by a brood frame. Particular attention is directed to the internal dimensions of the holder H with respect to the length and height of the group of honey section to be held thereby, thus providing bee spaces which the bees will not plug with propolis, said spaces serving also to give ample room for allowing relative movement of the filled honey sections, when the latter are to be removed from the holder.

As excellent results have been obtained from the details disclosed, they are preferably followed. However, within the scope of the invention as claimed, modifications may be made.

I claim:

1. In a holder for a plurality of contacting tiers of contacting honey sections; a rectangular frame whose internal length is greater by at least a "bee space" than the length of one tier of the contacting sections, the internal height of said frame being greater than the combined height of the tiers by at least a "bee space".

2. In a holder for a plurality of contacting tiers of contacting honey sections; a rectangular frame whose internal length is greater by at least a "bee space" than the length of one tier of the contacting sections, the internal height of said frame being greater than the combined height of the tiers by at least a "bee space", and means for holding the honey sections in contact with one horizontal side member of the frame and in contact with one vertical end member of said frame, leaving bee passages between said sections and the other side and end members of the frame.

3. In a holder for a plurality of contacting tiers of contacting honey sections; a rectangular frame whose internal length is greater by at least a "bee space" than the length of one tier of the contacting sections, the internal height of said frame being greater than the combined height of the tiers by at least a "bee space", and wedges for holding the honey sections in contact with one horizontal side member of the frame and in contact with one vertical end member of said frame, leaving bee passages between said sections and the other side and end members of the frame, said wedges being adapted for insertion between the honey sections and said other side and end members of the frame.

In testimony whereof I have hereunto affixed my signature.

HENRY C. LONG.